US012597112B2

(12) United States Patent
Namiki et al.

(10) Patent No.: US 12,597,112 B2
(45) Date of Patent: Apr. 7, 2026

(54) INSPECTION DEVICE, INSPECTION METHOD, AND RECORDING MEDIUM

(71) Applicant: NEC Corporation, Tokyo (JP)

(72) Inventors: Shigeaki Namiki, Tokyo (JP); Takuya Ogawa, Tokyo (JP); Keiko Inoue, Tokyo (JP); Shoji Yachida, Tokyo (JP); Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 18/279,353

(22) PCT Filed: Mar. 4, 2021

(86) PCT No.: PCT/JP2021/008454
§ 371 (c)(1),
(2) Date: Aug. 29, 2023

(87) PCT Pub. No.: WO2022/185481
PCT Pub. Date: Sep. 9, 2022

(65) Prior Publication Data
US 2024/0153061 A1 May 9, 2024

(51) Int. Cl.
G06K 9/00 (2022.01)
G06T 7/00 (2017.01)
(Continued)

(52) U.S. Cl.
CPC .............. G06T 7/0004 (2013.01); G06T 7/11 (2017.01); G06V 10/267 (2022.01);
(Continued)

(58) Field of Classification Search
CPC ........ G06N 3/045; G06N 20/00; G06N 3/084; G06N 3/044; G06N 3/08; G06N 5/01;
(Continued)

(56) References Cited

U.S. PATENT DOCUMENTS

2002/0164065 A1* 11/2002 Cai ......................... G03F 7/705
430/5
2004/0037467 A1* 2/2004 Wenzel ................ G06V 10/752
382/203
(Continued)

FOREIGN PATENT DOCUMENTS

JP        H04-142412 A      5/1992
JP        2004-294360 A     10/2004
(Continued)

OTHER PUBLICATIONS

International Search Report for PCT Application No. PCT/JP2021/008454, mailed on May 25, 2021.

*Primary Examiner* — Alex Kok S Liew
(74) *Attorney, Agent, or Firm* — Sughrue Mion, PLLC

(57) ABSTRACT

In an inspection device, a classification means classifies temporal captured images which capture a target object, into a plurality of groups. A recognition means recognizes the captured images belonging to each of the groups, and outputs a determination result for each of the groups. An integration means integrates respective determination results of the groups, and outputs a final determination result.

9 Claims, 11 Drawing Sheets

(51) Int. Cl.
  *G06T 7/11* (2017.01)
  *G06V 10/26* (2022.01)
  *G06V 10/762* (2022.01)
  *G06V 10/764* (2022.01)

(52) U.S. Cl.
  CPC .......... *G06V 10/762* (2022.01); *G06V 10/764* (2022.01); *G06T 2207/10016* (2013.01)

(58) Field of Classification Search
  CPC ........ G06N 20/20; G06N 3/063; G06N 20/10; G06N 3/048; G06N 5/022; G06N 3/04; G06N 3/049; G06N 3/043; G06N 7/01; G06N 5/025; G06N 3/02; G06N 3/088; G06N 3/0464; G06N 3/065; G06N 5/04; G06N 3/09; G06N 3/0455; G06N 3/047; G06N 3/126; G06T 2207/20081; G06T 2207/20084; G06T 7/0004; G06T 7/0012; G06T 7/001; G06T 7/11; G06T 7/70; G06T 2207/10081; G06T 2207/20076; G06T 2200/24; G06T 2207/10088; G06T 2207/20072; G06T 2207/30101; G06T 2207/30172; G06T 2207/10016; G06T 2207/30016; G06T 2207/30108; G06T 2207/30148; G06T 19/006; G06T 7/80; G06T 2207/30232; G06T 1/60; G06V 10/82; G06V 10/764; G06V 10/454; G06V 20/52; G06V 20/176; G06V 20/56; G06V 10/25; G06V 10/774
  See application file for complete search history.

(56) References Cited

U.S. PATENT DOCUMENTS

| | | | | |
|---|---|---|---|---|
| 2004/0252878 | A1* | 12/2004 | Okuda | G06F 18/2415 |
| | | | | 382/226 |
| 2019/0034800 | A1 | 1/2019 | Shiratani | |
| 2019/0362486 | A1* | 11/2019 | Diao | G06T 7/0004 |

FOREIGN PATENT DOCUMENTS

| | | | |
|---|---|---|---|
| JP | 2005-172608 | A | 6/2005 |
| JP | 2011-007553 | A | 1/2011 |
| JP | 2015-038441 | A | 2/2015 |
| WO | 2017/175282 | A1 | 10/2017 |

* cited by examiner

100

〈ACQUISITION OF TARGET OBJECT IMAGE SEQUENCE〉

〈LEARNING OF GROUP DISCRIMINATION UNIT〉

<LEARNING PROCESS OF GROUP DISCRIMINATION UNIT>

⟨AT INSPECTION (AT INFERENCE)⟩

INSPECTION DEVICE, INSPECTION METHOD, AND RECORDING MEDIUM

This application is a National Stage Entry of PCT/JP2021/008454 filed on Mar. 4, 2021, the contents of all of which are incorporated herein by reference, in their entirety.

TECHNICAL FIELD

The present disclosure relates to an inspection technology of a target object using an image.

BACKGROUND ART

A technique for carrying out an inspection for an abnormality using an image of a product has been proposed. For example, Patent Document 1 discloses an appearance inspection device which captures an image of a tablet as the product to be inspected in three directions, and performs a shape inspection, a color inspection, and a crack inspection on the image in the three directions to determine whether the tablet is qualified or not.

PRECEDING TECHNICAL REFERENCES

Patent Document

Patent Document 1: Japanese Laid-open Patent Publication No. 2005-172608

SUMMARY

Problem to be Solved by the Invention

In an appearance inspection device of Patent Document 1, the same inspection is performed in three directions with respect to an image of an object to be inspected. However, in reality, anomalies tend to vary from surface to surface or part to part of each product to be inspected.

It is one object of the present disclosure to provide an inspection device capable of performing an abnormality determination in an image recognition method suitable for each plane or each portion of a product to be inspected.

Means for Solving the Problem

According to an example aspect of the present disclosure, there is provided an inspection device including:
  a classification means configured to classify temporal captured images which capture a target object, into a plurality of groups;
  a recognition means configured to recognize the captured images belonging to respective groups by using recognition models corresponding to the groups, and output a determination result for each of the groups; and
  an integration means configured to integrate respective determination results of the groups, and output a final determination result.
According to another example aspect of the present disclosure, there is provided an inspection method comprising:
  classifying temporal captured images which capture a target object, into a plurality of groups;
  recognizing the captured images belonging to respective groups by using recognition models corresponding to the groups, and outputting a determination result for each of the groups; and integrating respective determination results of the groups, and outputting a final determination result.
According to a further example aspect of the present disclosure, there is provided a recording medium storing a program, the program causing a computer to perform a process including:
  classifying temporal captured images which capture a target object, into a plurality of groups;
  recognizing the captured images belonging to respective groups by using recognition models corresponding to the groups, and outputting a determination result for each of the groups; and
  integrating respective determination results of the groups, and outputting a final determination result.

Effect of the Invention

According to the present disclosure, it becomes possible to perform an abnormality determination in an image recognition method suitable for each plane or each portion of a product to be inspected.

EXAMPLE EMBODIMENTS

Figure 1A:
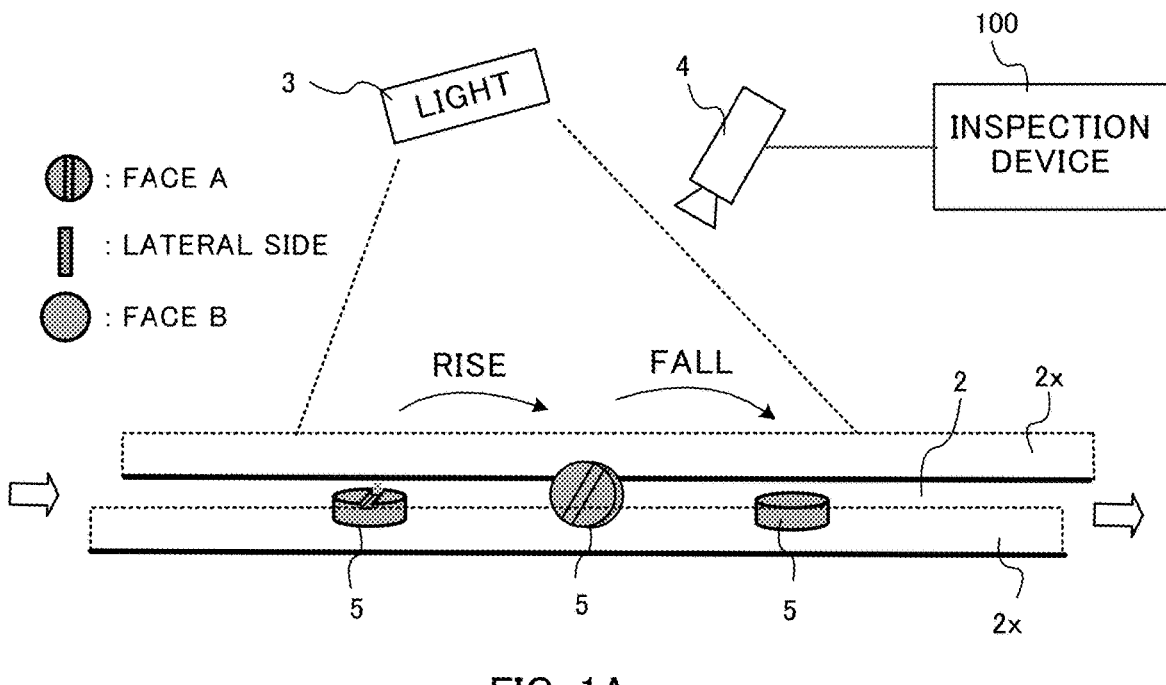
FIG. 1A to FIG. 1C illustrate an inspection using an inspection device.

In the following, example embodiments will be described with reference to the accompanying drawings.
<Basic Principle>
First, a basic principle of an inspection device 100 will be described according to the present disclosure. FIG. 1A illustrates a state of an inspection using the inspection device 100. In the present example embodiment, a product to be inspected is a tablet 5. The tablet 5 moves in a direction of an arrow in a rail 2 by fanning the air in the direction of the arrow. Note that for convenience of illustration, a lateral wall 2x of the rail 2 is illustrated as a dashed line in FIG. 1A.
A light 3 and a high-speed camera 4 are disposed above the rail 2.

Depending on a shape of the object and a type of an abnormality to be detected, a plurality of lights in various intensities and lighting ranges are installed. Especially in a case of a small object such as the tablet 5, since a type, a degree, a position, and the like of several lights may be used to capture images under various lighting conditions.

The high-speed camera 4 captures images of the tablet 5 under illumination at high speed and outputs captured images to the inspection device 100. In a case where each image is taken by the high-speed camera 4 while moving the tablet 5, it is possible to capture images of a minute abnormality which exists on the tablet 5 without missing that abnormality. Specifically, the abnormality which occurs on the tablet may be adhesion of a hair, a minute crack, or the like.

The tablet 5 is reversed by a reversing mechanism provided on the rail 2. In FIG. 1A, the inversion mechanism is omitted for convenience, and only the behavior of the tablets on rail 2 is illustrated. Hereinafter, for convenience of explanation, a side of the tablet 5 with a split line is referred to as a "face A," a side without the split line as a "face B," and a face of the tablet 5 from a side view is referred to as a "lateral side". Note that the "split line" refers to a cut or indentation made in one side of the tablet in order to split the tablet in half.

Figure 1B:
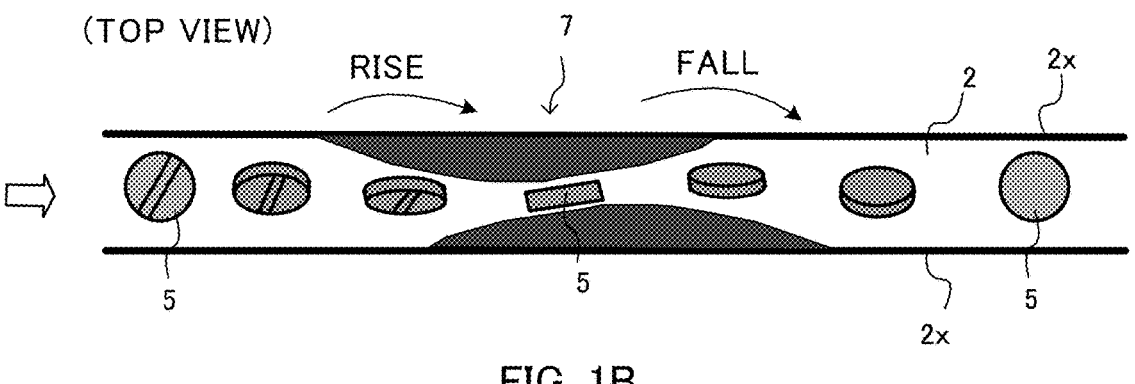

FIG. 1B schematically illustrates the reversing mechanism provided on the rail 2. As illustrated, on an inner side of the lateral wall 2x of the rail 2, there is a narrowing section 7 which narrows the width of the rail 2 as the reversing mechanism. The narrowing section 7 is formed so that the lateral wall 2x of the rail 2 extends inward. The tablet 5 basically moves in a falling down state in an area other than the narrowing section 7, but rises up when passing through the narrowing section 7 and falls down on an opposite side after passing through the narrowing section 7. Accordingly, the tablet 5 is reversed on the rail 2.

Figure 1C:
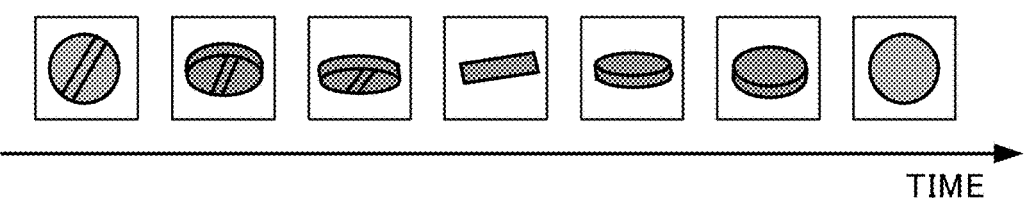

FIG. 1C illustrates an example of the captured images by the high-speed camera 4 (hereinafter, simply referred to as the "camera 4"). Incidentally, FIG. 1C is an image obtained by extracting only the region of the tablet 5 which is the target object from among the captured images by the camera 4, and corresponds to a target object image sequence to be described later. The tablet 5 is set so that the face A is on the top and moves in the direction of the arrow on the rail 2 from the left side in FIG. 1B, while the camera 4 takes images of the face A of the tablet 5. After that, the tablet 5 rises in the narrowing section 7, and at that time the camera 4 takes images of the lateral side of the tablet 5. When passing through the narrowing section 7, the tablet 5 falls to an opposite side, and the camera 4 then captures images of the face B of the tablet 5. Thus, as illustrated in FIG. 1C, temporal images including the face A, the lateral side, and the face B of the tablet (hereinafter, also referred to as an "image series") is obtained. Note that since the tablet 5 is fed by the air, the tablet rises in the narrowing section 7 and moves on the rail 2 while rotating in a circumferential direction. Therefore, it is possible for the camera 4 to capture the entire circumference of the lateral side of the tablet 5. Accordingly, it is possible to capture every side of the tablet 5.

First Example Embodiment

[Hardware Configuration]

Figure 2:
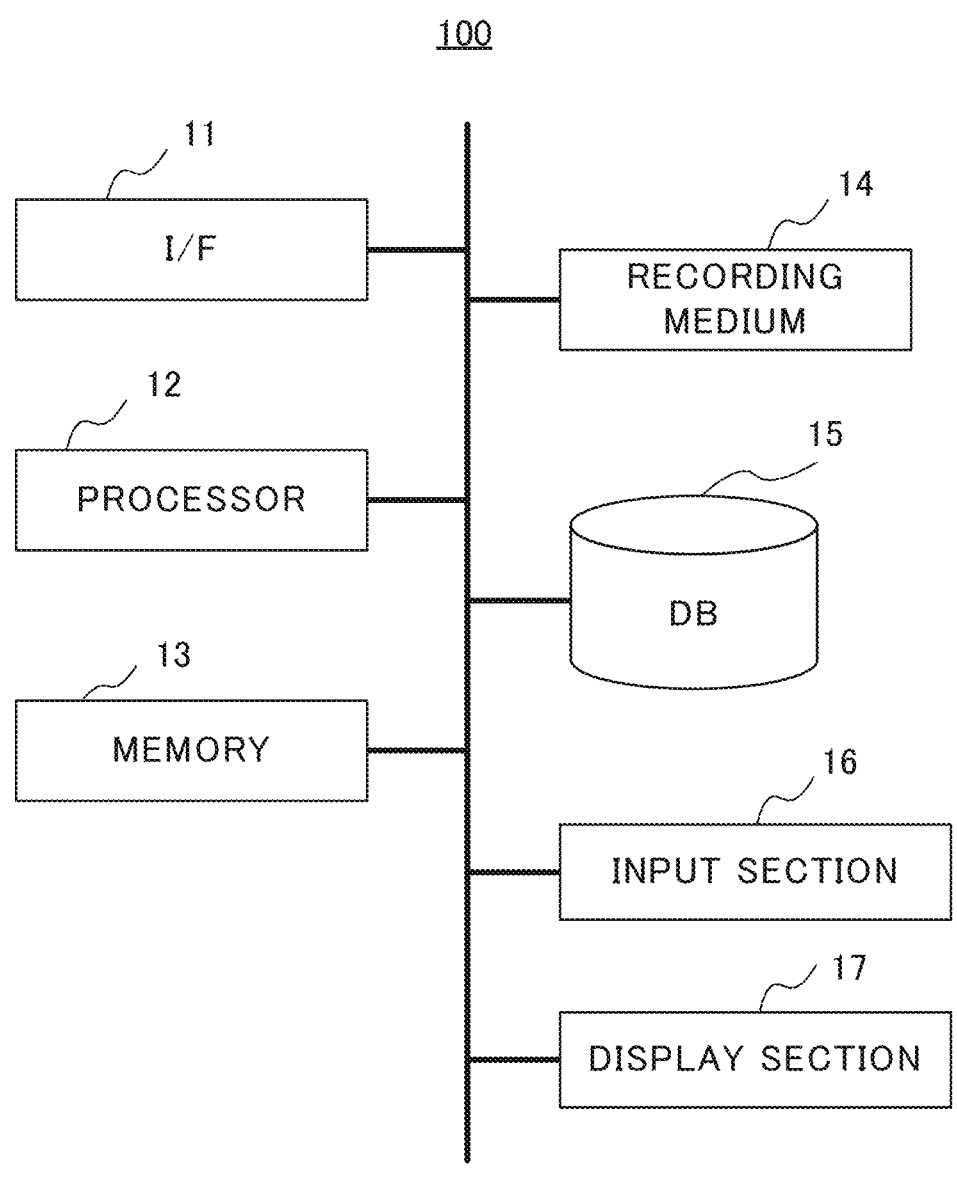
FIG. 2 illustrates a hardware configuration of the inspection device according to a first example embodiment.

FIG. 2 is a block diagram illustrating a hardware configuration of the inspection device 100 according to the first example embodiment. As illustrated, the inspection device

100 includes an interface (I/F) 11, a processor 12, a memory 13, a recording medium 14, a database (DB) 15, an input section 16, and a display section 17.

The interface 11 inputs and outputs data to and from an external device. Specifically, the image sequence (temporal images) of the tablet captured by the camera 4 is input through the interface 11. Also, a determination result of the abnormality generated by the inspection device 100 is output to the external device through the interface 11.

The processor 12 corresponds to one or more processors each being a computer such as a CPU (Central Processing Unit) and controls the entire inspection device 100 by executing programs prepared in advance. The processor 12 may be a GPU (Graphics Processing Unit) or a FPGA (Field-Programmable Gate Array). The processor 12 executes an inspection process to be described later.

The memory 13 is formed by a ROM (Read Only Memory), a RAM (Random Access Memory), and the like. The memory 13 is also used as a working memory during executions of various processes by the processor 12.

The recording medium 14 is a non-volatile and non-transitory recording medium such as a disk-shaped recording medium or a semiconductor memory and is formed to be detachable with respect to the inspection device 100. The recording medium 14 records various programs executed by the processor 12. When the inspection device 100 performs the various processes, the programs recorded on the recording medium 14 are loaded into the memory 13 and executed by the processor 12.

The DB 15 stores the image sequence input from the camera 4 as needed. The input section 16 includes a keyboard, a mouse, and the like for the user to perform instructions and input. The display section 17 is formed by, for instance, a liquid crystal display, and displays a recognition result of the target object.

[Functional Configuration]

Figure 3:
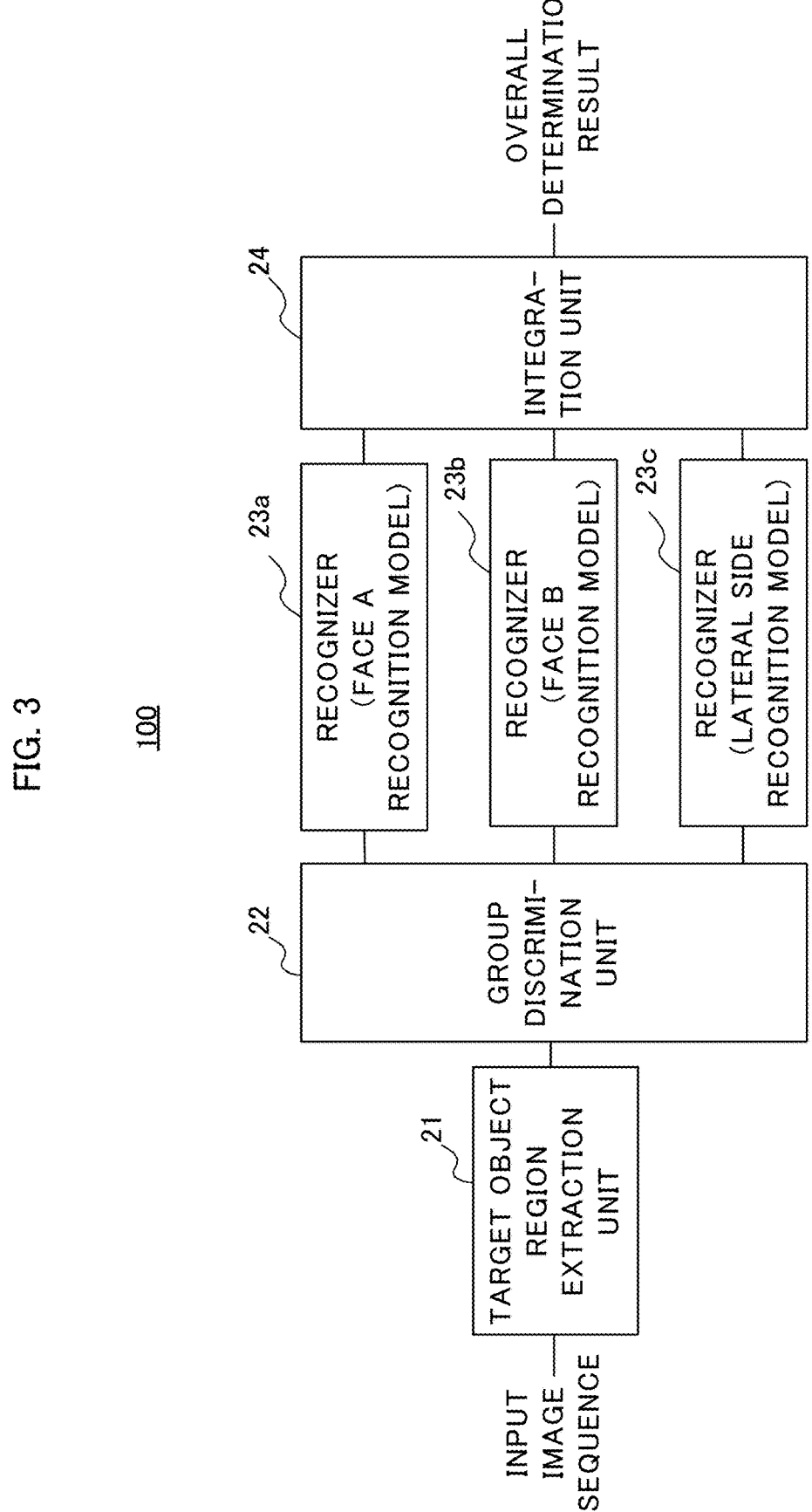
FIG. 3 illustrates a functional configuration of the inspection device according to the first example embodiment.

FIG. 3 is a block diagram illustrating a functional configuration of the inspection device 100 according to the first example embodiment. The inspection device 100 determines the abnormality of the tablet 5 based on a sequence of images input from the camera 4 (hereinafter, referred to as an "input image sequence"), and outputs the determination result. As illustrated, the inspection device 100 includes a target object region extraction unit 21, a group discrimination unit 22, recognizers 23a to 23c, and an integration unit 24.

The target object region extraction unit 21 extracts a region of the tablet 5 which is a target object to be inspected from the input image sequence, and outputs an image sequence (hereinafter, referred to as the "target object image sequence") indicating the region of the target object. The target object image sequence corresponds to a set of images in which only a portion of the target object is extracted from the images captured by the camera 4 as illustrated in FIG. 1C.

The group discrimination unit 22 uses a group discrimination model to classify a plurality of frame images forming the target object image sequence based on a surface of the tablet 5. In the present example embodiment, the group discrimination unit 22 separates the target object image sequence into three groups: a face A image, a face B image, and a lateral side image. Accordingly, the group discrimination unit 22 outputs the face A image to the recognizer 23a, outputs the face B image to the recognizer 23b, and outputs the lateral side image to the recognizer 23c.

Figure 4A:
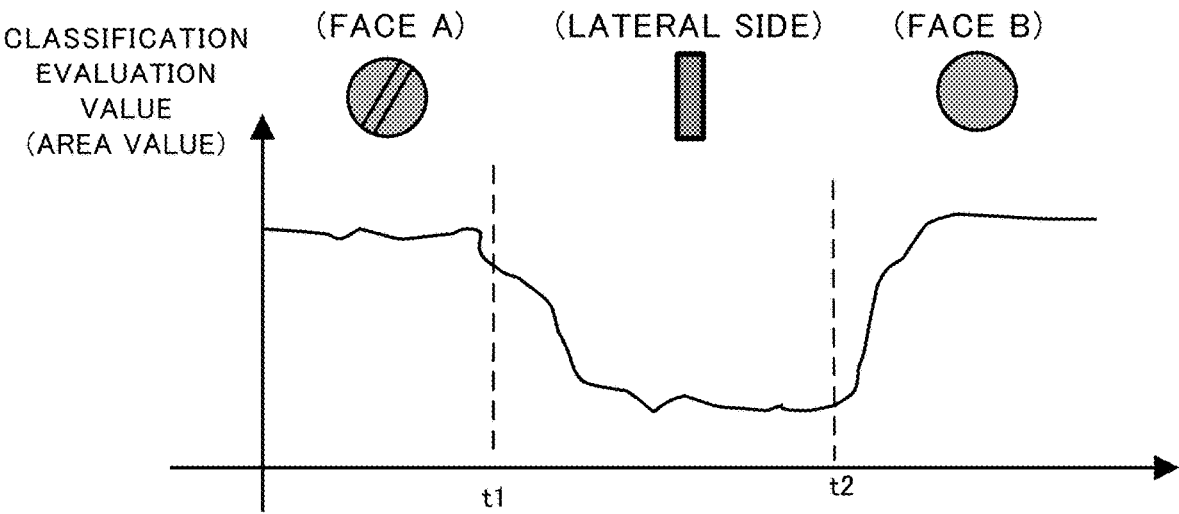
FIG. 4A and FIG. 4B illustrate a classification method by a group discrimination unit.

FIG. 4A illustrates an example of a classification method by the group discrimination unit 22. In this example, the group discrimination unit 22 calculates image statistics of the target object image sequence as a classification evaluation value, and performs the classification at a steep change point. In the example in FIG. 4A, an area value of the tablet 5 being the target object is used as the classification evaluation value. In a case where the target object image sequence of the tablet 5 is obtained as illustrated in FIG. 1C, since each region of the face A and the face B of the tablet 5 is large and a region of the lateral side is small, the area value of the tablet is changed as depicted in FIG. 4A. Accordingly, the group discrimination unit 22 divides the target object image sequence into three groups of a face A image, a lateral side image, and a face B image by change points t1 and t2 concerning the area value of the tablet 5.

Figure 4B:
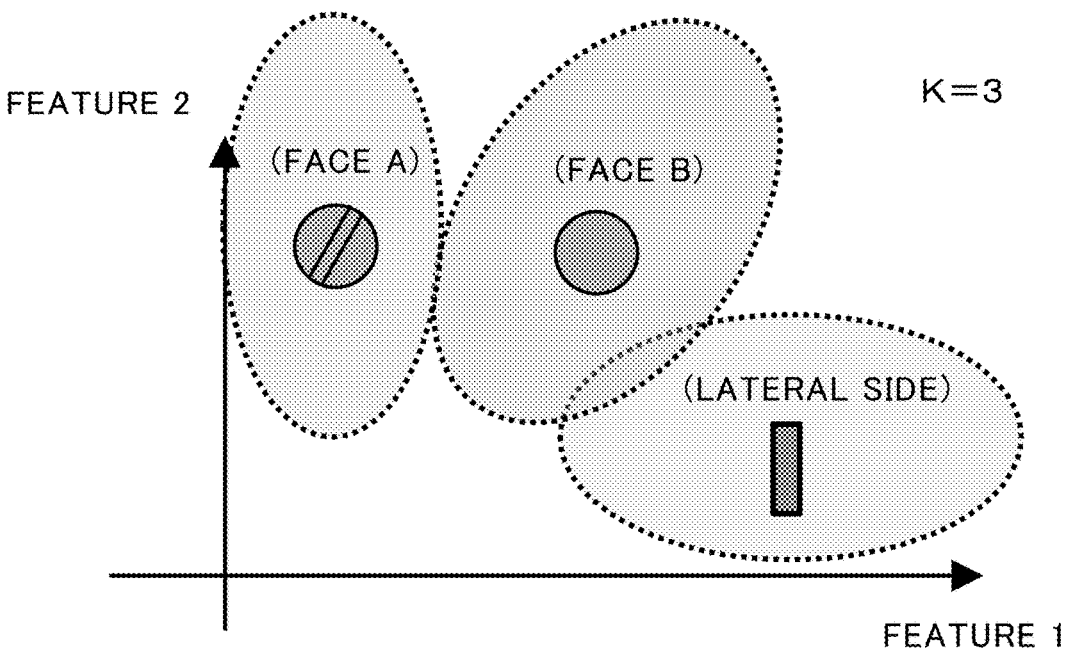

FIG. 4B illustrates another example of the classification method by the group discrimination unit 22. In this example, the group discrimination unit 22 performs the classification by clustering. Specifically, as depicted in FIG. 4B, the number of clusters K=3 is set, and the group discrimination unit 22 performs the classification by a general clustering algorithm using the features 1 and 2 obtained from the target object image sequence. By clustering, the target object image sequence is divided into three groups: a face A image, a face B image, and a lateral side image. As a clustering algorithm, for instance, a K-means method, hierarchical clustering, or the like may be used.

The recognizers 23a to 23c performs an image recognition with respect to the image sequences for each of groups, and determines whether there is any abnormality. The recognizer 23a determines a presence or absence of the anomaly based on the face A image by using a face A recognition model. The recognizer 23b determines a presence or absence of the anomaly based on the face B image by using a face B recognition model. The recognizer 23c determines a presence or absence of the anomaly based on the lateral side image by using a lateral side recognition model. Each of the face A recognition model, the face B recognition model, and the lateral side recognition model is an image recognition model which has been trained in advance. Each of the recognizers 23a to 23c outputs a determination result to the integration unit 24.

The integration unit 24 generates a final determination result of the tablet 5 based on the determination results output respectively from the recognizers 23a to 23c. For instance, in a case where the recognizers 23a to 23c perform a binary decision (0: normal, 1: abnormal) for a normality or the abnormality of the tablet 5, the integration unit 24 uses a max function, and decides the final determination result so as to indicate the abnormality when even one of the determination results of the three groups indicates the anomaly. Moreover, in a case where each of the recognizers 23a to 23c outputs a degree of abnormality for the tablet 5 in a range of "0" to "1", the integration unit 24 outputs the degree of abnormality for an image having the highest degree of abnormality by using the max function as the final determination result.

In the above-described configuration, the object region extraction unit 21 corresponds to an example of a target object extraction means, the group discrimination unit 22 corresponds to an example of a classification means, each of the recognizers 23a to 23c corresponds to an example of a reorganization means, and the integration unit 24 corresponds to an example of an integration means.

[Process of Each Unit]

(Acquisition of Target Object Image Sequence)

Figures 5, 6:
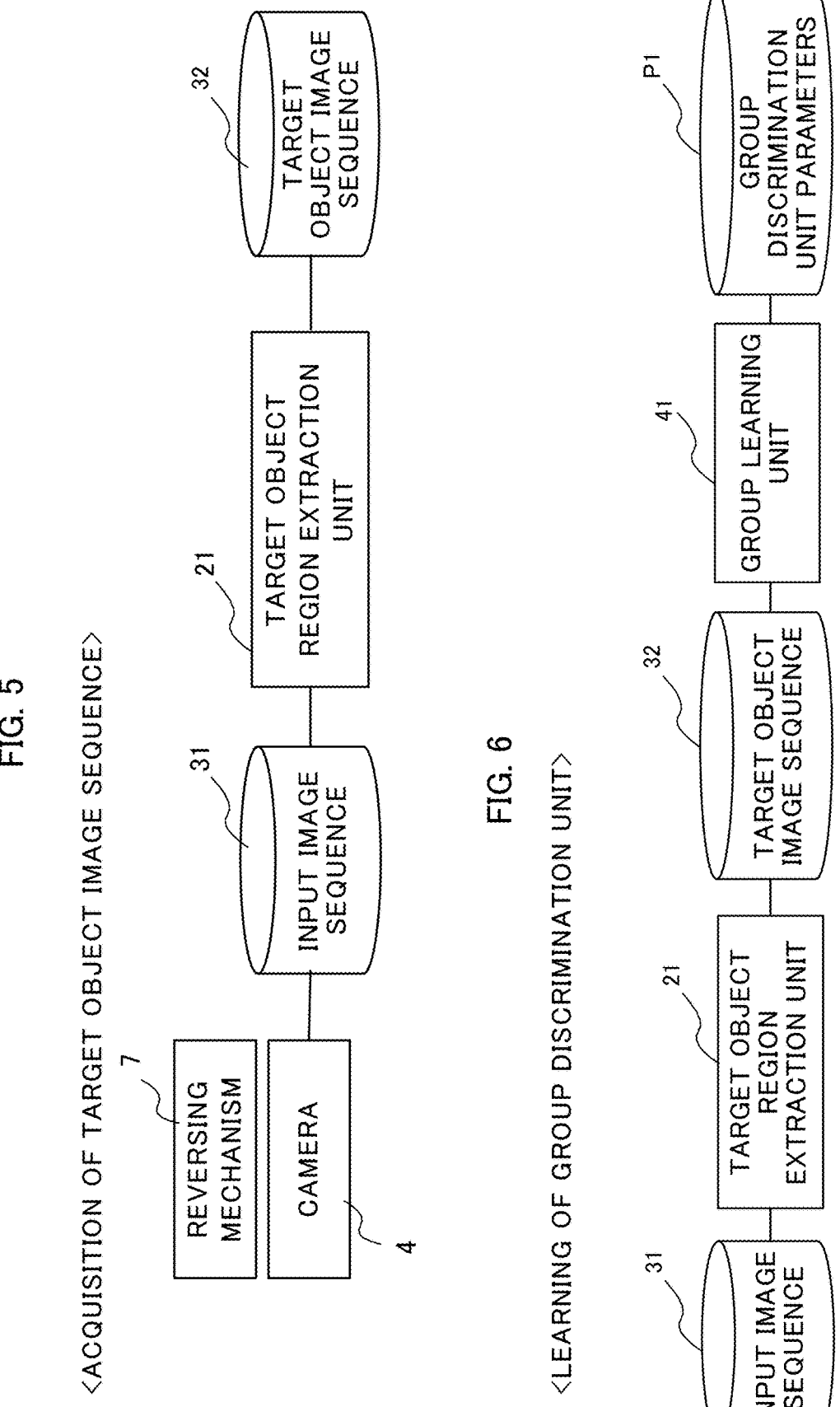
FIG. 5 illustrates a configuration for acquiring a target object image sequence.
FIG. 6 illustrates a configuration for learning of a group discrimination unit.

FIG. 5 illustrates a configuration for acquiring the target object image sequence. An input image sequence 31 is acquired by reversing the tablet 5 being the target object by a reversing mechanism 7 within an angle of a view of the camera 4 and capturing scenes with the camera 4. The target object region extraction unit 21 outputs a target object image sequence 32 indicating a portion of the target object based on the input image sequence 31. Accordingly, the target object image sequence as illustrated in FIG. 1C is acquired.

(Learning of Group Discrimination Unit)

FIG. 6 illustrates a configuration for learning of the group discrimination unit 22. Note that in this example, the group discrimination unit 22 performs the classification by clustering as illustrated in FIG. 4 B. The input image sequence captured by the camera 4 is input to the target object region extraction unit 21 as described above, and the target object region extraction unit 21 outputs the target object image sequence 32 to the group learning unit 41. The group learning unit 41 trains the group discrimination model, which is used by the group discrimination unit 22, by using the target object image sequence, and outputs parameters of the group discrimination unit 22.

Figure 7:
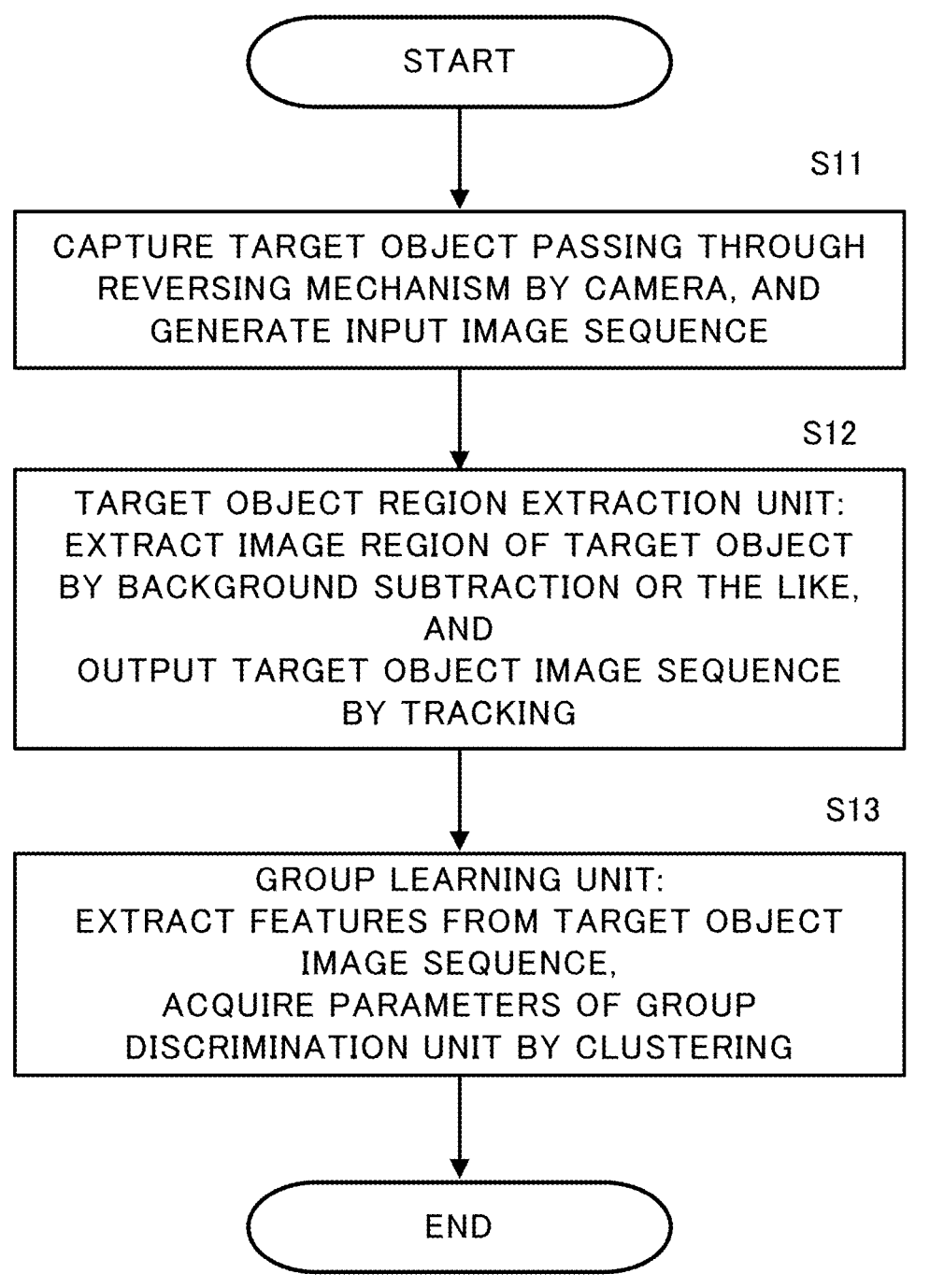
FIG. 7 is a flowchart of a learning process of the group discrimination unit.

FIG. 7 is a flowchart of a learning process of the group discrimination unit 22. This learning process is realized by executing a program prepared in advance by the processor 12 depicted in FIG. 2. First, the target object passing through the reversing mechanism is captured by the camera 4, and the input image sequence 31 is generated (step S11). Next, the target object region extraction unit 21 extracts an image region of the target object from the input image sequence 31 using a background subtraction or the like, and outputs the target object image sequence 32 by tracking (step S12).

Next, the group learning unit 41 extracts features from the target object image sequence 32, performs the clustering, and acquires parameters P1 of the group discrimination unit 22 (referred to as "group discrimination unit parameters P1") (step S13). After that, the learning process is terminated.

(Training of Recognizers)

Figure 8:
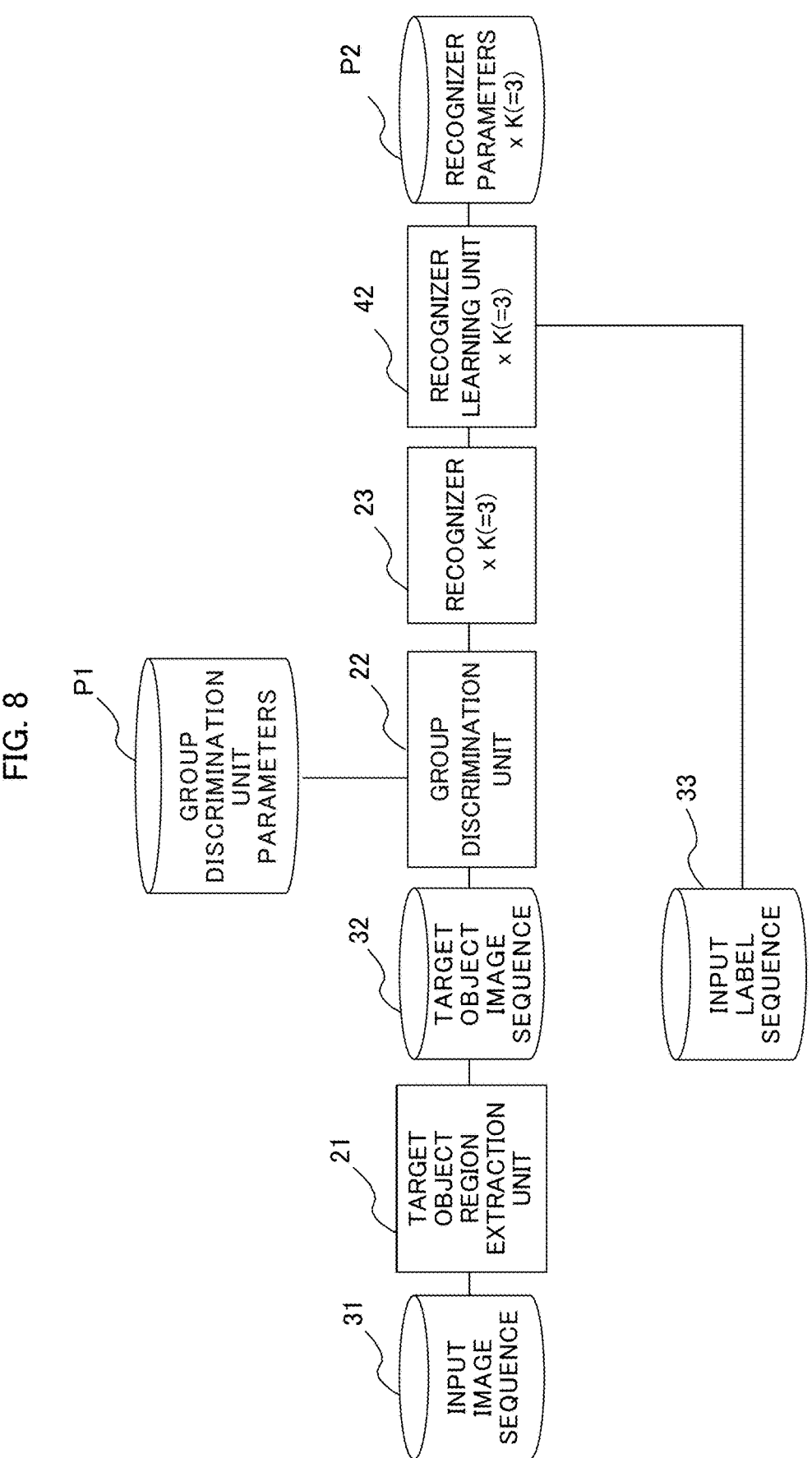
FIG. 8 illustrates a configuration for learning of a recognizer.

FIG. 8 illustrates a configuration for the training of the recognizers 23a to 23c. Similar to the training of the group discrimination unit 22, the target object region extraction unit 21 generates the target object image sequence 32 from the input image sequence 31, and outputs the generated target object image sequence 32 to the group discrimination unit 22. Note that for the training of the recognizers 23a to 23c, an input label sequence 33 indicating correct answers for the target object image sequence 32 is provided in advance.

The group discrimination unit 22 is set with the group discrimination unit parameters P1 acquired by training of the group discrimination unit 22 described above. The group discrimination unit 22 classifies the input target object image sequence 32, and outputs images for each group to K (=3) recognizers. In the present example embodiment, the group discrimination unit 22 divides the target object image sequence 32 into the face A image, the face B image, and the lateral side image, and outputs these images to respective recognizers 23a to 23c corresponding to the images.

Each of the recognizers 23a to 23c outputs recognition results corresponding to input images to K (=3) recognizer learning units 42. In this example embodiment, three recognizer learning units 42 are provided in association with the recognizers 23a to 23c. Each of the recognizer learning units 42 compares the recognition result input from each of the recognizers 23a to 23c with the input label sequence 33 to optimize each of the recognizers 23a to 23c and generates recognizer parameters P2 for each of the recognizers 23a to 23c.

Figure 9:
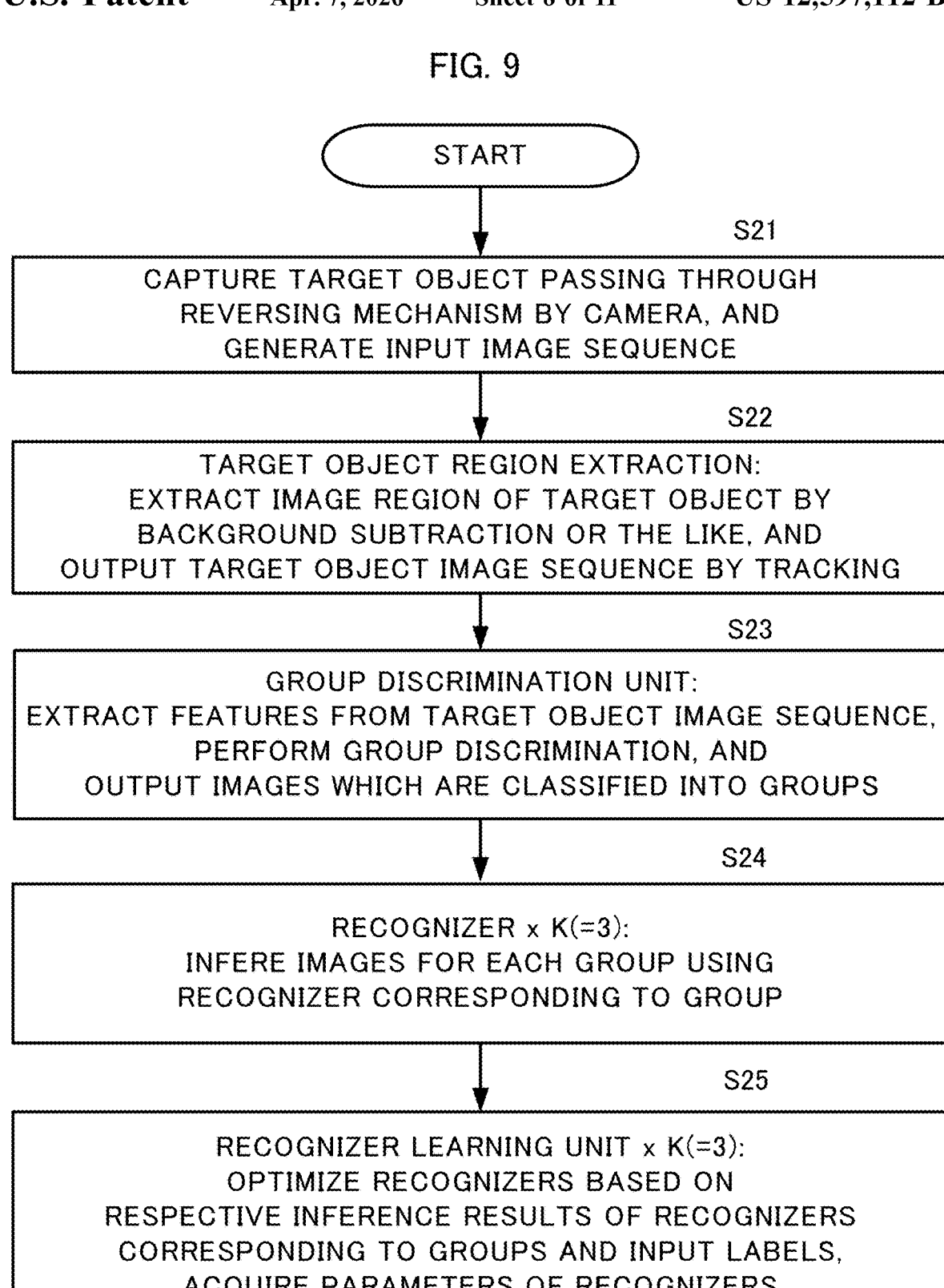
FIG. 9 is a flowchart of a learning process of the recognizer.

FIG. 9 is a flowchart of a learning process for the recognizers. This learning process is realized by executing a program prepared in advance by the processor 12 illustrated in FIG. 2. Since steps S21 and S22 are the same as steps S11 and S12 in the learning process of the group discrimination unit described above, the explanation thereof will be omitted.

The group discrimination unit 22 extracts features from the target object image sequence 32 to perform a group discrimination, and outputs images classified for each group (step S23). Next, an inference of the images for each group is performed using one of the recognizers 23*a* to 23*c* corresponding to the group (step S24). Next, the recognizer learning unit 42 optimizes the recognizers 23*a* to 23*c* based on inference results corresponding to respective groups and the input label sequence 33, and acquires the parameters for respective recognizers 23*a* to 23*c* (step S25). After that, the learning process is terminated.

(Process at Inspection)

Figure 10:
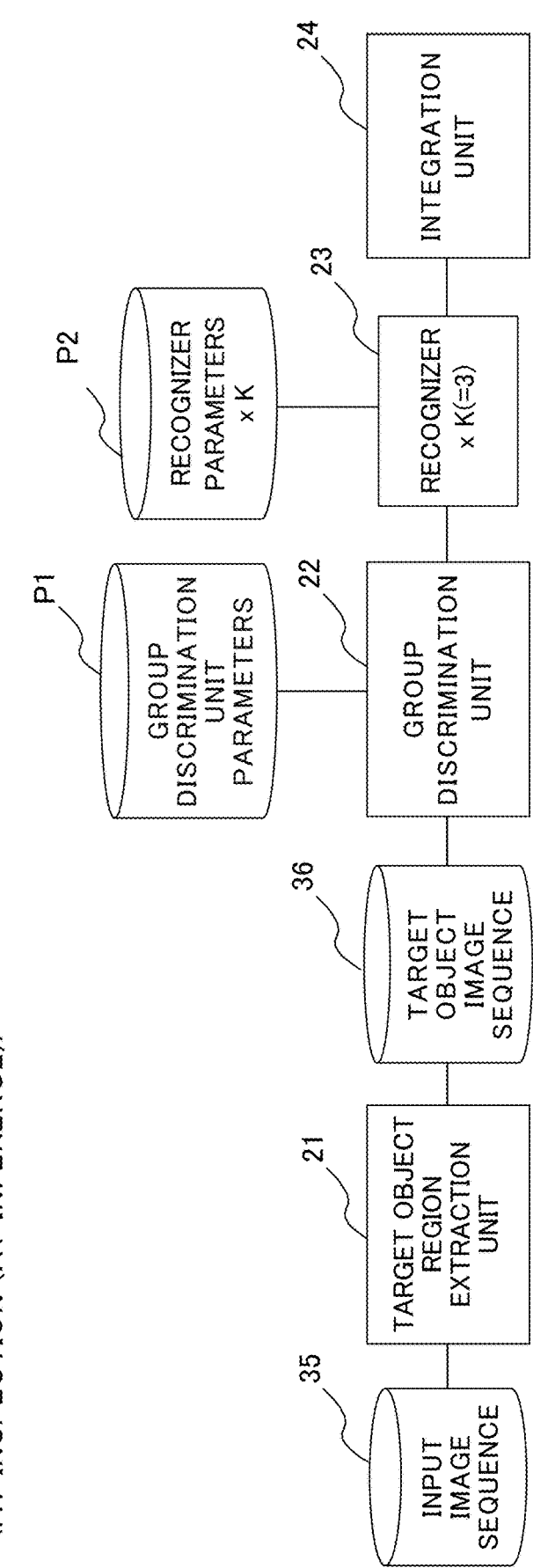
FIG. 10 illustrates a configuration at the inspection by the inspection device.

FIG. 10 illustrates a configuration at the inspection (at the inference) in the inspection device 100. At the inspection, the input image sequence 35 acquired by capturing the actual target object to be inspected is input. In addition, the group discrimination unit parameters P1 acquired by the above-described learning unit are set in the group discrimination unit 22. In addition, the recognizer parameters P2 obtained by the above-described learning are set in the recognizers 23*a* to 23*c*.

First, the target object region extraction unit 21 generates the target object image sequence 36 based on the input image sequence 35, and outputs the generated target object image sequence 36 to the group discrimination unit 22. The group discrimination unit 22 divides the target object image sequence 36 into three groups, and outputs the face A image, the face B image, and the lateral side image to the recognizers 23*a* to 23*c*, respectively. Each of the recognizers 23*a* to 23*c* determines the presence or absence of abnormality in the input images, and outputs the determination result to the integration unit 24. The integration unit 24 integrates the input determination results and outputs the final determination result.

Figure 11:
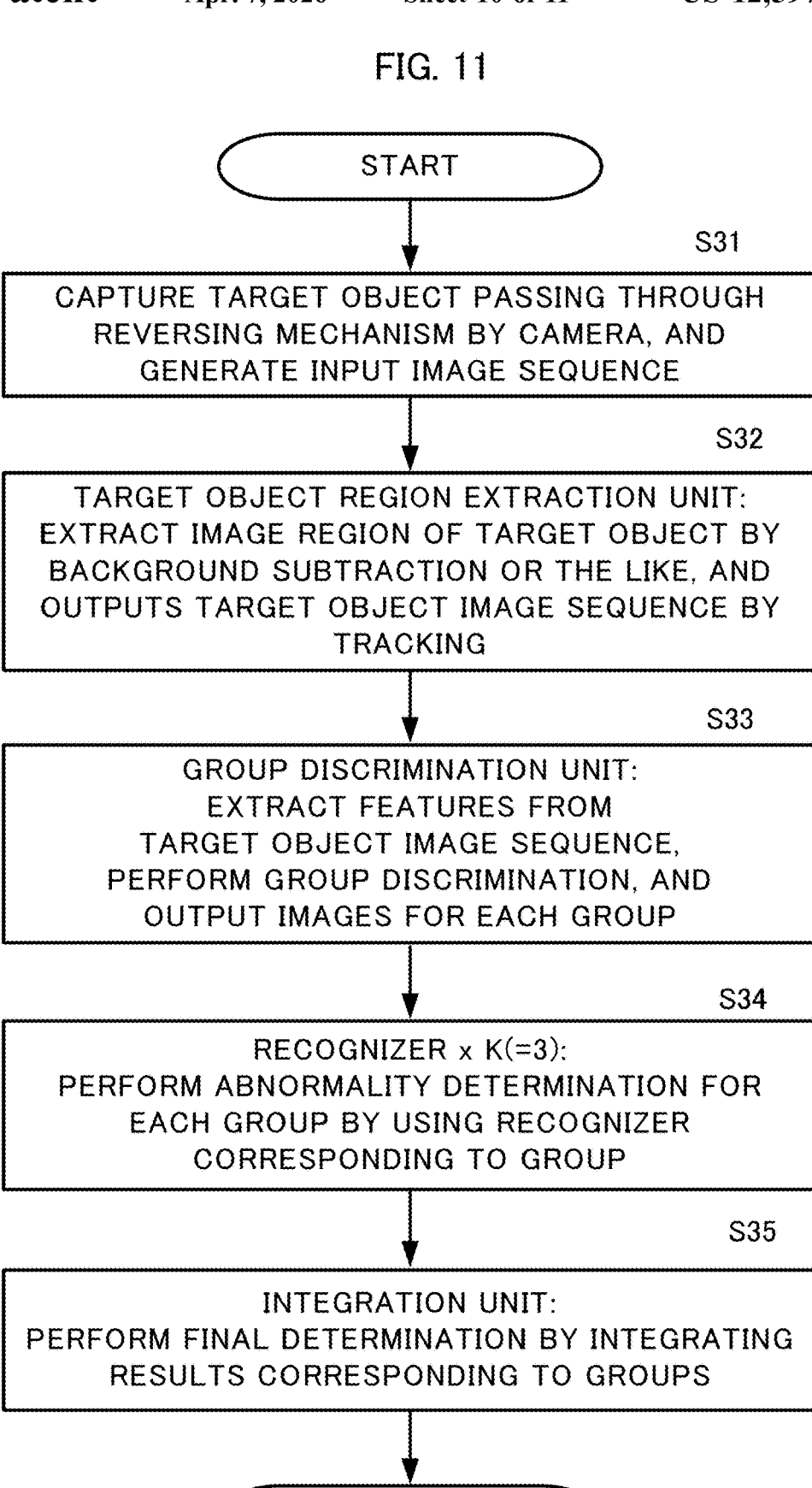
FIG. 11 illustrates a flowchart of an inspection process by the inspection device.

FIG. 11 is a flowchart of the inspection process by the inspection device 100. This inspection process is realized by executing a program prepared in advance by the processor 12 depicted in FIG. 2. First, the target object passing through the reversing mechanism is captured by the camera 4, and the input image sequence 35 is generated (step S31). The input image sequence 35 includes the images acquired by capturing the actual target object to be inspected. Next, the target object region extraction unit 21 extracts the image region of the target object from the input image sequence 35 by using the background subtraction or the like, and outputs the target object image sequence 36 by tracking (step S32).

Next, the group discrimination unit 22 extracts the features from the target object image sequence 36 to perform the group discrimination, and outputs images for each of the groups (step S33). Next, each of the recognizers 23*a* to 23*c* performs the abnormality determination with respect to the images of the corresponding group (step S34). Subsequently, the integration unit 24 performs the final determination by integrating the determination results of the recognizers 23*a* to 23*c* for each of the groups (step S35). After that, the inspection process is terminated.

[Modification]

(Modification 1)

In the above example, the group discrimination unit 22 extracts and classifies the features from images of the target object as depicted in FIG. 4; however, without performing feature extraction, the group discrimination unit 22 may classify the features using index information (for instance, a frame number or the like) indicating a temporal position in the target object image sequence. In detail, using the reversing mechanism depicted in FIG. 1B, assuming that each tablet 5 exhibits the same behavior, in the target object image sequence obtained for one tablet, an initial predetermined number of images are the face A images, a subsequent predetermined number of images are the lateral side images, and images from there to the end are the face B images. Accordingly, for instance, when 100 images (frame images) are taken for one tablet, the group discrimination unit 22 simply determines and classifies first images to be the face A images, subsequent 30 images to be the lateral side images, and last 35 images to be the face B images.

Moreover, instead of using the index information indicating the temporal position in the target object image sequence, the group discrimination unit 22 may classify based on a capturing position in the input image sequence. Now, as depicted in FIG. 1B, it is assumed that the camera 4 captures a range which includes the entire series of behaviors of the tablet 5 from a state in which the face A faces up to a state in which the face B faces up by being reversed by the reversing mechanism. In this case, a range on a left side in the entire capturing range of the camera 4 includes the face A images, a range of a center includes the lateral side images, and a range on a right side includes the face B images. Therefore, the group discrimination unit 22 can classify the images of the target objects based on the position coordinates in the entire capturing range of the camera 4.

As a specific process, when the images of the target object are extracted from the input image sequence, the target object region extraction unit 21 adds the position coordinates of the target object in the entire capturing range of the camera 4 to each extracted image, and outputs the extracted image. In the entire capturing range, the group discrimination unit 22 may determine each image to be the face A image when the position coordinates added to the image of the input target object are in the left range, each image to be the lateral side image when the position coordinates added to the image are in the central range, and each image to be the face B image when the position coordinates added to the image are in the right range.

(Modification 2)

The group discrimination unit 22 classifies the target object image sequence into a predetermined number of groups (three groups in the present example embodiment), but in a case where there is a group that does not even belong to one captured image among the predetermined number of groups, the inspection device 100 determines that the inspection is insufficient and may output that fact as the final determination result. For instance, in the present example embodiment, in a case where a result of the classification indicates that the face A image and the face B image exist but no lateral side image exists at all, the inspection device 100 determines to be an insufficient inspection since a correct determination is not performed, and may redo from acquiring of the input sequence image.

Second Example Embodiment

Figures 12, 13:
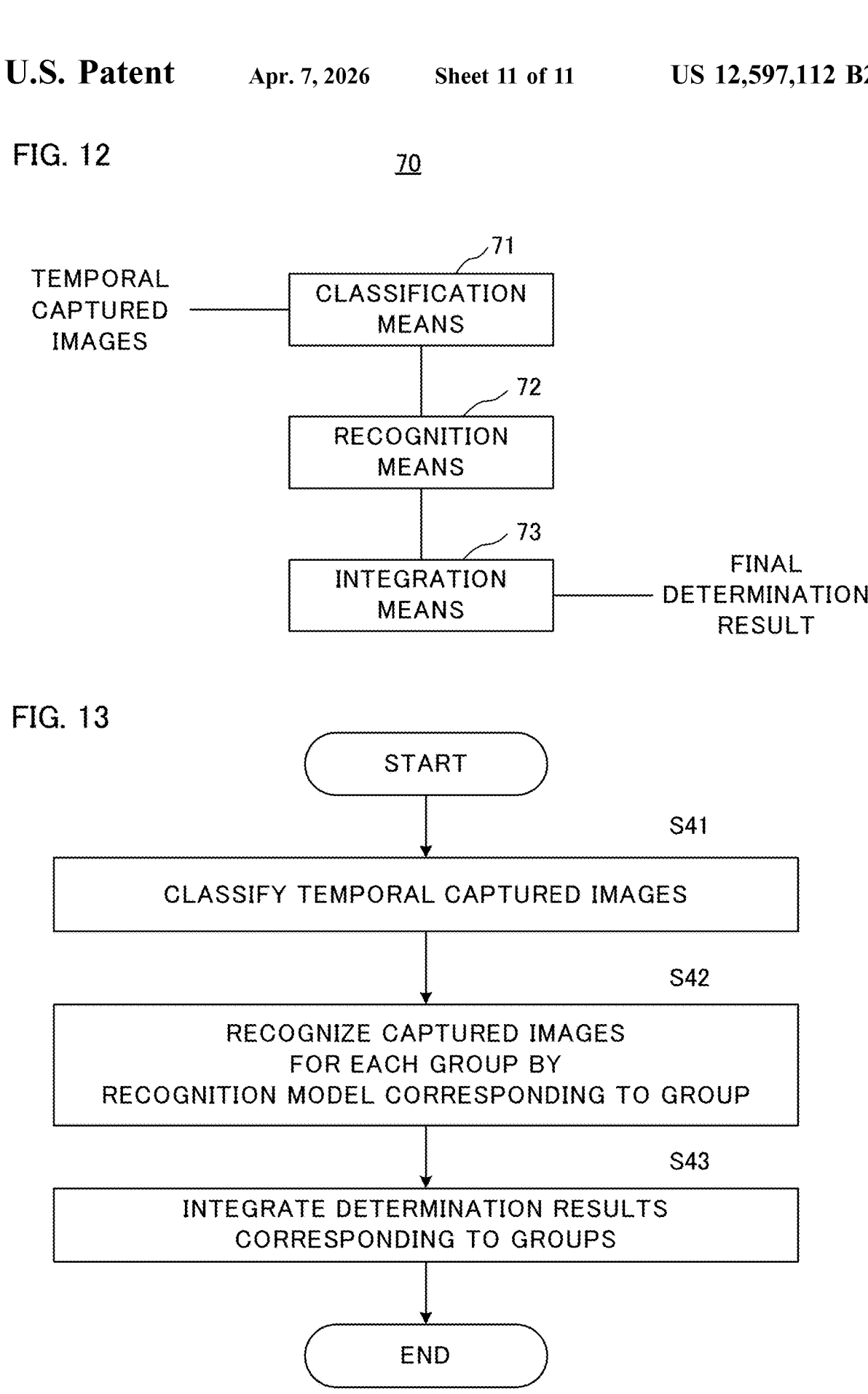
FIG. 12 illustrates a functional configuration of an inspection device according to a second example embodiment.
FIG. 13 is a flowchart of an inspection process by the inspection device according to the second example embodiment.

FIG. 12 is a block diagram illustrating a functional configuration of an inspection device according to a second example embodiment. The inspection device 70 includes a classification means 71, a recognition means 72, and an integration means 73.

FIG. 13 is a flowchart of an inspection process by the inspection device 70. First, the classification means 71 classifies temporal captured images which are acquired by capturing the target object into a plurality of groups (step S41). Next, the recognition means 72 recognizes each captured image belonging to a corresponding group by using a recognition model corresponding to the corresponding group, and outputs the determination result for each group (step S42). Subsequently, the integration means integrates determination results for all groups, and outputs a final determination result (step S43). After that, the inspection process is terminated. According to the second example embodiment, since each of the classified images is recognized using the recognition model corresponding to that group, and the determination of the abnormality is performed, it is possible to determine the abnormality by an appropriate method according to features such as a surface or a portion of the target object.

A part or all of the example embodiments described above may also be described as the following supplementary notes, but not limited thereto.

(Supplementary Note 1)

An inspection device comprising:

a classification means configured to classify temporal captured images which capture a target object, into a plurality of groups;

a recognition means configured to recognize the captured images belonging to respective groups, and output a determination result for each of the groups; and an integration means configured to integrate respective determination results of the groups, and output a final determination result.

(Supplementary Note 2)

The inspection device according to supplementary note 1, wherein the classification means performs a classification based on a change of an area of the target object in the captured images.

(Supplementary Note 3)

The inspection device according to supplementary note 1, wherein the classification means performs a classification by clustering in which features of the captured images are used.

(Supplementary Note 4)

The inspection device according to supplementary note 1, wherein the captured images are images which capture the target object being reversed within a view angle of an imaging device; and the classification means performs a classification based on information indicating a temporal position in the temporal captured images.

(Supplementary Note 5)

The inspection device according to supplementary note 1, further comprising a target object extraction means configured to generate the temporal captured images by extracting a region of the target object from whole images in the time series which capture a series of behaviors of the target object, wherein the object extraction means adds position information in the whole images with respect to individual captured images included in the temporal captured images, and the classification means performs the classification based on the position information in the whole images.

(Supplementary Note 6)

The inspection device according to any one of supplementary notes 1 to 5, wherein the recognition means outputs whether the target object is normal or abnormal as the determination information, and the integration means determines an abnormality as the final determination result in a case where even one of determination results corresponding to the groups indicates the abnormality.

(Supplementary Note 7)

The inspection device according to any one of supplementary notes 1 to 5, wherein the recognition means outputs a degree of the abnormality of the target object as the determination result, and the integration means determines a highest degree of the abnormality among the determination results corresponding to the groups.

(Supplementary Note 8)

The inspection device according to any one of supplementary notes 1 to 7, wherein the classification means classifies the captured images into a predetermined number of groups, and the inspection device further includes a determination means configured to determine an insufficient inspection with respect to a case where there is a group to which none of the captured images belong.

(Supplementary Note 9)

An inspection method comprising:

classifying temporal captured images which capture a target object, into a plurality of groups;

recognizing the captured images belonging to respective groups by using recognition models corresponding to the groups, and outputting a determination result for each of the groups; and integrating respective determination results of the groups, and outputting a final determination result.

(Supplementary Note 10)

A recording medium storing a program, the program causing a computer to perform a process comprising:

classifying temporal captured images which capture a target object, into a plurality of groups;

recognizing the captured images belonging to respective groups by using recognition models corresponding to the groups, and outputting a determination result for each of the groups; and integrating respective determination results of the groups, and outputting a final determination result.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

4 High-speed camera
5 Tablet
7 Reversing mechanism
12 Processor
21 Target object region extraction unit
22 Group discrimination unit
23 Recognition unit
24 Integration unit
41 Group learning unit
42 Recognizer learning unit
100 Inspection device

What is claimed is:

1. An inspection device comprising:

a memory storing instructions; and one or more processors configured to execute the instructions to:

classify temporal captured images which capture a target object, into a plurality of groups;

recognize the captured images belonging to respective groups by using recognition models corresponding to the groups, and output a determination result for each of the groups;

integrate respective determination results of the groups, and output a final determination result;

generate the temporal captured images by extracting a region of the target object from whole images in the time series which capture a series of behaviors of the target object;

add position information in the whole images with respect to individual captured images included in the temporal captured images; and classify based on the position information in the whole images.

2. The inspection device according to claim 1, wherein the processor performs a classification based on a change of an area of the target object in the captured images.

3. The inspection device according to claim 1, wherein the processor performs a classification by clustering in which features of the captured images are used.

4. The inspection device according to claim 1, wherein the captured images are images which capture the target object being reversed within a view angle of an imaging device; and the processor performs a classification based on information indicating a temporal position in the temporal captured images.

5. The inspection device according to claim 1, wherein the processor outputs whether the target object is normal or abnormal as the determination information, and the processor determines an abnormality as the final determination result in a case where even one of determination results corresponding to the groups indicates the abnormality.

6. The inspection device according to claim 1, wherein the processor outputs a degree of the abnormality of the target object as the determination result, and the processor determines a highest degree of the abnormality among the determination results corresponding to the groups.

7. The inspection device according to claim 1, wherein the processor classifies the captured images into a predetermined number of groups, and the processor is further configured to determine an insufficient inspection with respect to a case where there is a group to which none of the captured images belong.

8. An inspection method comprising:

classifying temporal captured images which capture a target object, into a plurality of groups;

recognizing the captured images belonging to respective groups by using recognition models corresponding to the groups, and outputting a determination result for each of the groups; and integrating respective determination results of the groups, and outputting a final determination result;

generating the temporal captured images by extracting a region of the target object from whole images in the time series which capture a series of behaviors of the target object;

adding position information in the whole images with respect to individual captured images included in the temporal captured images; and classifying based on the position information in the whole images.

9. A non-transitory computer-readable recording medium storing a program, the program causing a computer to perform a process comprising:

classifying temporal captured images which capture a target object, into a plurality of groups;

recognizing the captured images belonging to respective groups by using recognition models corresponding to the groups, and outputting a determination result for each of the groups;

integrating respective determination results of the groups, and outputting a final determination result;

generating the temporal captured images by extracting a region of the target object from whole images in the time series which capture a series of behaviors of the target object;

adding position information in the whole images with respect to individual captured images included in the temporal captured images; and classifying based on the position information in the whole images.

* * * * *